United States Patent [19]

Goshima et al.

[11] Patent Number: 4,776,935
[45] Date of Patent: Oct. 11, 1988

[54] HIGH DENSITY RECORD INCLUDING CARBON BLACK PARTICLES PURIFIED BY ELECTROLYSIS

[75] Inventors: Toshikazu Goshima, Sagamihara; Akira Nishizawa, Yokohama; Kazuhira Namikawa, Yokohama; Toshiaki Hamaguchi, Yokohama; Mutsuaki Nakamura, Yokohama, all of Japan

[73] Assignee: Victor Company of Japan, Limited, Japan

[21] Appl. No.: 612,011

[22] Filed: May 18, 1984

[30] Foreign Application Priority Data

May 23, 1983 [JP] Japan .................................. 58-89086

[51] Int. Cl.$^4$ .............................................. C25F 5/00
[52] U.S. Cl. .................................... 204/130; 369/276; 369/288
[58] Field of Search ............... 369/275, 286, 288, 276; 358/276; 252/510, 511; 524/495; 428/288; 430/281; 204/61, 129, 130; 260/998.16; 264/105, 106

[56] References Cited

U.S. PATENT DOCUMENTS

| | | | |
|---|---|---|---|
| 4,234,398 | 11/1980 | Yamamato | 204/130 |
| 4,389,288 | 7/1983 | Vaughan | 204/129 |
| 4,401,533 | 8/1983 | Saito et al. | 204/130 |
| 4,472,295 | 9/1984 | Fox et al. | 369/276 |
| 4,472,336 | 9/1984 | Enoki et al. | 264/106 |

FOREIGN PATENT DOCUMENTS

| | | |
|---|---|---|
| 3214344 | 1/1983 | Fed. Rep. of Germany . |
| 2071702 | 9/1981 | United Kingdom ................ 204/130 |

OTHER PUBLICATIONS

The Condensed Chemical Dictionary, p. 826.
Hackh's Chemical Dictionary, p. 647.
Handbook of Chemistry and Physics, p. D-103.

Primary Examiner—Raymond F. Cardillo
Assistant Examiner—Hoa T. Nguyen
Attorney, Agent, or Firm—Lowe, Price, LeBlanc, Becker & Shur

[57] ABSTRACT

A high density information record of the electrostatic capacitance type which comprises a record substrate on which signal information is recorded as geometric variations. The substrate is made of a vinyl chloride resin, and carbon black which is purified by electrolysis to remove impurities therefrom.

3 Claims, 1 Drawing Sheet

U.S. Patent   Oct. 11, 1988   4,776,935
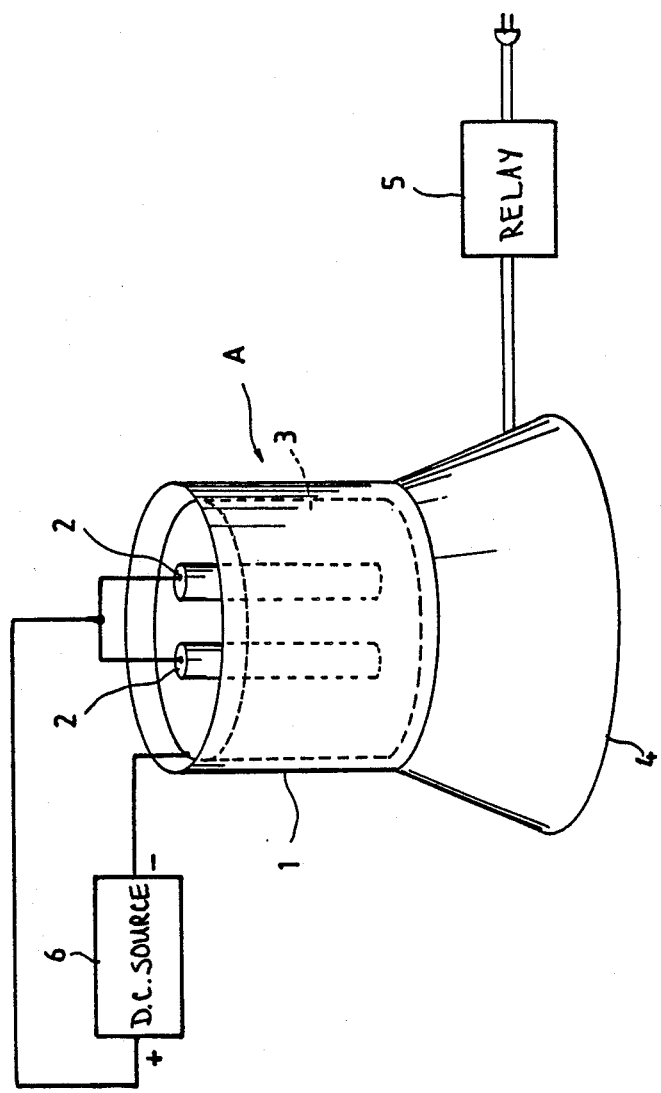

HIGH DENSITY RECORD INCLUDING CARBON BLACK PARTICLES PURIFIED BY ELECTROLYSIS

BACKGROUND OF THE INVENTION

1. Field of the Invention

This invention relates to the recording art and more particularly, to high density information records, such as video or digital audio discs, on which information signals are recorded as geometric variations.

2. Description of the Prior Art

In certain information playback systems, information signals are encoded as geometric variations or pits in a spiral plane or groove, or in concentric planes or grooves on an information recording medium or substrate. The medium on which the information signals have been recorded is reproduced in the following manner. When a pickup stylus such as a diamond having an electrode thereon is scanned relative to a recorded track of the medium, capacitive variations are established between the pickup stylus and the medium due to the geometric variations in the plane or groove.

Several types of information records have been proposed for use in the above-described type of electrostatic capacitance playback system. Typical of such an information record is one which is obtained by press molding a conductive plastic composition comprising a resin such as polyvinyl chloride and a conductive material such as carbon black.

When the press molding of vinyl chloride resin compositions comprising carbon black particles dispersed therein is repeated using stampers for mass production, fine defects are inevitably formed on the stampers. Once formed, the defects are invariably press molded, as they are, along with information signals. We have found that such defects cause signal defects when the defect-bearing record is played back. In other words, information signals to be recorded are not accurately formed on recording media owing to the presence of fine defects on the stampers.

In order to overcome the drawback caused by fine defects on stampers, we have made studies and, as a result, found that the fine defects are formed largely due to presence of impurities in carbon black. Carbon black ordinarily contain alkali metals and alkaline earth metals. Aside from these metals, silica, sulfur, aluminium and the like are also contained as impurities. Of these, silica and aluminium tend to damage the surfaces of stampers when a resin composition comprising carbon black is press molded under high compression pressure into video or digital audio discs. Sulfur serves to promote thermal decomposition of vinyl chloride resin and corrode processing machines. By the corrosion, foreign matters based on iron may be incorporated in the discs. Moreover, when information records are placed under high pressure temperature and high conditions, calcium or alkali or alkaline earth metals derived from carbon black may cause rugged defects, leading to generation of signal defects upon playback of the records.

SUMMARY OF THE INVENTION

It is an object of the present invention to provide high density information records of the electrostatic capacitance type which make use of carbon black from which impurities are removed whereby signal defects are significantly reduced with little or no dropouts or stylus jumps being involved.

It is another object of the invention to provide high density information records of the above-mentioned type made of resin compositions comprising carbon black which do not substantially damage stampers when press molded whereby the yield of the record is improved with a reduction of production cost.

It is a further object of the invention to provide high density information records which involve little signal defects when played back.

Other objects and further advantages and features of the invention will become apparent from the following description with respect to embodiments of the invention when taken in conjunction with the accompanying drawing.

BRIEF DESCRIPTION OF THE DRAWING

The FIGURE is a schematic view of an apparatus for treating carbon black by electrolysis.

DETAILED DESCRIPTION AND PREFERRED EMBODIMENTS OF THE INVENTION

High density information records of the invention are made of resin compositions comprising a vinyl chloride resin and carbon black which is purified by electrolysis to remove impurities such as calcium, aluminium, silica, sulfur and the like therefrom.

The vinyl chloride resins useful in the present invention are vinyl chloride homopolymers, copolymers of vinyl chloride with other monomers such as vinyl acetate, ethylene, propylene, alkyl acrylates and the like.

Carbon black should be purified in order to remove such impurities as indicated above. Ordinary carbon black usually contains the impurities in amounts of 0.5 to 3.0 wt% of sulfur, 300 to 3000 ppm of calcium, 150 to 1000 ppm of silica, and 150 to 300 ppm of aluminium. These impurities are conveniently reduced in amount or removed by electrolysis.

Reference is now made to the sole FIGURE which shows an apparatus for electrolytic purification. In the FIGURE, there is generally shown an apparatus A which includes a glass electrolysis vessel 1 having anodes 2 made, for example, of platinum or carbon and a cathode 3 having a wide surface area and made, for example, of a stainless steel plate. The vessel 1 is placed on a heater 4 having a relay 5. The anodes 2 and the cathode 3 are connected to a DC source 6 as shown.

In operation, carbon black in the form of particles are placed in the vessel 1 containing water of high purity such as ion-exchanged water. The amount of carbon black is up to 300 g/l, preferably up to about 100 g/l. After dispersion of the carbon black particles, a DC voltage of about 10 V is applied between the anode 2 and the cathode 3 to effect electrolysis under conditions of over 1 A-hour at a relatively high bath temperature of, for example, about 90° C. As a result, impurities such as silica, aluminium, calcium and the like are deposited on the surface of the cathode 3 having a wide surface area. Sulfur is released in air as hydrogen sulfide. In order to cause the electrolysis and the release of sulfur to proceed smoothly, the bath temperature is conveniently from 20° to 110° C. After completion of the electrolysis, the anodes 2 and the cathode 3 are removed, after which the aqueous dispersion of carbon black may be dried as it is. Alternatively, a suitable organic solvent immiscible with water such as n-hexane may be added to the vessel 1 and agitated sufficiently so that the carbon black is moved toward the n-hexane phase. Subsequently, the n-hexane phase is collected, from which the n-hexane is removed to obtain purified carbon black.

The time, voltage and other conditions for the electrolysis may largely vary depending on the electric resistance of the carbon black dispersion, the distance between the anode and cathode electrodes, the shapes of the electrodes, the type and concentration of carbon black being purified, and the content of impurities. In general, the time is from 0.5 to 10 hours and the voltage is from 1 V to 3 KV.

When carbon black is dried after the electrolytic treatment, it is important to treat or agitate the carbon black particles so as not to coagulate the particles into hard lump or beads.

The carbon black purified by the electrolysis has significantly reduced contents of impurities as will be particularly illustrated hereinafter.

For fabrication of record articles such as video or digital audio discs, purified carbon black particles are mixed with vinyl chloride resin in an amount of from 5 to 30 wt% of the resin. Additives ordinarily used for these purposes may be also added to the resin composition in amounts not impeding the effects of the composition. Examples of additives include heat stabilizers, plasticizers, lubricants and the like. The resin composition is usually pelletized by a suitable means. The pellets are press molded into video or digital audio discs by a known manner. These mixing, pelletizing and press-molding techniques are well known in the art and are not further described herein.

The present invention is described in more detail by way of examples and comparative example.

EXAMPLE 1

Treatment of Carbon Black by Electrolysis

Ion-exchanged water and carbon black (Black Pearl 2000 (CSX-150), product of Cabot Co., Ltd. of U.S.A.) were placed in an electrolysis vessel of the type shown in the FIGURE in an amount of about 100 g/l. In the vessel, there were used two carbon bars as an anode and a stainless steel plate, as a cathode, disposed on the inner wall surface of the vessel. The temperature of the mixture in the vessel was maintained at 90° C. by the use of a heater. The dispersion was subjected to electrolysis under conditions of 15 V and 4 A-hour. Thereafter, the dispersion was cooled down to room temperature and, after removal of the electrodes, about 500 ml of n-hexane was added to the vessel, followed by sufficient agitation and collection of the n-hexane phase containing carbon black therein. The dispersion was heated under reduced pressure to remove the hexane therefrom and dry the carbon black, thereby obtaining purified carbon black.

EXAMPLES 2 AND 3

Treatment of Carbon Black by Electrolysis

The general procedure of Example 1 was repeated except that after the electrolysis of 4 A-hour and 2 A-hour (Examples 2 and 3), the aqueous dispersion was heated and dried under reduced pressure without use of n-hexane, thereby obtaining two types of purified carbon black.

The thus obtained three types of purified carbon black were subjected to the atomic absorption method to determine contents of impurities. The results are shown in the following table.

| | Ash Content (%) | Impurities in Carbon Black | | | |
|---|---|---|---|---|---|
| | | Sulfur (%) | Calcium (ppm) | Silica (ppm) | Aluminum (ppm) |
| Carbon Black of Example 1 | 0.1 | 0.1 | 50 | 70 | 80 |
| Carbon Black of Example 2 | 0.3 | 0.3 | 100 | 70 | 80 |
| Carbon Black of Example 3 | 0.7 | 0.5 | 500 | 150 | 155 |
| Starting Carbon Black | 1.2 | 1.5 | 1250 | 300 | 230 |

Note:
The ash content was determined as follows: 1.5 g of carbon black was accurately weighed and burnt in a crucible at 800° C. for 6 hours, and the content was calculated from a difference between the initial amount of the carbon black and the amount after the burning.

EXAMPLES 4 TROUGH 6

One hundred parts by weight of a thermoplastic vinyl chloride-ethylene copolymer resin having an average degree of polymerization of 450 and an ethylene content of 1.5% (commercially available under the name of VE-N from Tokuyama Sekisui Ind. Co., Ltd.), 5 parts by weight of dibutyl tin mercapto ester stabilizer (STANN JF-95, by Sankyo Organic Chemicals Co., Ltd.), 2 parts by weight of a fatty acid and glycerine ester lubricant (RES-210, by Riken Vitamin Co., Ltd.), 0.5 part by weight of a fatty acid and alcohol ester lubricant (Splendor E-10, by Kao Soaps Co., Ltd.), and 1.0 part by weight of dimethylpolysiloxane (RES-421, by Shinetsu Chem. Co., Ltd.) were placed in a Henschel mixer and blended at a high agitation speed until the blend was heated to about 110° C. Subsequently, the mixer was operated at low speed to cool the content, followed by adding 20 parts by weight of the purified carbon black particles obtained in Examples 1, 2 and 3, respectively, and blending at high speed again. The resulting blend was pelletized by means of a kneader available from Buss Co., Ltd., Switzerland. The three types of the pellets were press molded by a video disc press machine, thereby obtaining video discs.

COMPARATIVE EXAMPLE

The general procedure of Example 4 through 6 was repeated using non-treated carbon black indicated in the foregoing table, thereby obtaining video discs.

The four resin compositions obtained in Examples 4 through 6 and the Comparative Example were used to check signal defects of the resulting video discs and the degree of defects on stampers of the press machine. After molding 100 video discs for each resin composition, the number of defects involved in the signal-recorded portion of the 100th video disc was 20 for the disc of Example 4, 150 for the disc of Example 5, 350 for the disc of Example 6, and 500 for the disc of Comparative Example. When the video disc obtained after the 100th molding operation for each composition was played back, it was found that the number of signal defects per minute of the playback operation was 3 for the disc of Example 4, 8 for the disc of Example 5, 200 for the disc of Example 6, and 800 for the disc of the Comparative Example.

Thus, the use of purified carbon black according to the invention is very advantageous over the use of ordinary, non-treated carbon black as a conductive material of a resin composition for high density information record. Because only a reduced number of impurities affecting the stampers are present in carbon black used in a resin composition of the invention, stampers are not substantially damaged therewith, leading to an improvement of a yield of video or digital audio discs with a reduced number of defects.

What is claimed is:

1. A method for producing a high density information record of the electrostatic capacitance type which comprises a record substrate on which signal information is recorded as geometric variations, the substrate being made of a mixture of a vinyl chloride resin and carbon black used in an amount of from 5 to 30% by weight of the vinyl chloride resin, said method comprising the steps of purifying carbon black by electrolysis to remove sulfur, calcium, silica and aluminum impurities therefrom and mixing a vinyl chloride resin with from 5 to 30% by weight, based on the vinyl chloride resin, of said purified carbon black.

2. The method according to claim 1, wherein the electrolysis is effected at temperatures of 20° to 110° C.

3. The method according to claim 1, wherein said carbon black is purified to contain less than about 0.5% sulfur, less than about 300 ppm calcium, less than about 150 ppm silica and less than about 150 ppm aluminum.

* * * * *